(12) United States Patent
Nakai

(10) Patent No.: US 6,560,019 B2
(45) Date of Patent: *May 6, 2003

(54) DIFFRACTIVE OPTICAL ELEMENT AND OPTICAL SYSTEM HAVING THE SAME

(75) Inventor: Takehiko Nakai, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,364

(22) Filed: Sep. 14, 1999

(65) Prior Publication Data

US 2001/0015848 A1  Aug. 23, 2001

Related U.S. Application Data

(63) Continuation-in-part of application No. 09/241,851, filed on Feb. 2, 1999.

(30) Foreign Application Priority Data

Feb. 5, 1998 (JP) ............................ 10-039639
Sep. 17, 1998 (JP) ............................ 10-263020

(51) Int. Cl.⁷ ............................ G02B 5/18; G02B 27/44
(52) U.S. Cl. ........................ 359/569; 359/576; 359/566
(58) Field of Search ................. 359/565, 566, 359/569, 570, 571, 575, 576

(56) References Cited

U.S. PATENT DOCUMENTS

| | | |
|---|---|---|
| 4,936,665 A | 6/1990 | Whitney |
| 5,156,943 A | 10/1992 | Whitney |
| 5,386,319 A | 1/1995 | Whitney |
| 5,479,238 A | 12/1995 | Whitney |
| 6,081,389 A * | 6/2000 | Takayama et al. ........... 359/570 |
| 6,157,488 A * | 12/2000 | Ishii ............................ 359/576 |

FOREIGN PATENT DOCUMENTS

| | | |
|---|---|---|
| EP | 0 312 341 | 4/1989 |
| JP | 2521235 | 8/1996 |
| JP | 2554600 | 11/1996 |
| JP | 2554601 | 11/1996 |
| JP | 11-52235 | 2/1999 |
| JP | 11-52237 | 2/1999 |
| JP | 11-84244 | 3/1999 |
| JP | 2867375 | 3/1999 |
| JP | 2000-19400 | 1/2000 |

\* cited by examiner

Primary Examiner—Audrey Chang
(74) Attorney, Agent, or Firm—Fitzpatrick, Cella, Harper & Scinto

(57) ABSTRACT

In a diffractive optical element, first and second diffraction gratings of 10 μm or less in thickness made from materials of respective different Abbe numbers are laminated through an air layer. The grating thickness of the first diffraction grating is made to be 7.5 μm, and the grating thickness of the second diffraction grating is made to be 6.54 μm. Glass of the Abbe number of 63.8 is used for the material of the first diffraction grating, and an ultraviolet curable polymer of the Abbe number of 23.0 is used for the material of the second diffraction grating. Accordingly, the diffraction efficiency of the diffractive optical element is improved to 97% or higher throughout the entire visible spectrum.

21 Claims, 12 Drawing Sheets

PRIOR ART

DIFFRACTIVE OPTICAL ELEMENT AND OPTICAL SYSTEM HAVING THE SAME

CROSS-REFERENCE TO RELATED APPLICATIONS

This application is a continuation-in-part of application Ser. No. 09/241,851 filed Feb. 2, 1999.

BACKGROUND OF THE INVENTION

1. Field of the Invention

The present invention relates to a diffractive optical element and an optical system having the same and, more particularly, to a diffractive optical element of such a grating structure that diffracts light (energy) of a plurality of wavelengths or a certain band so that the diffracted light concentrates on a particular order (design order), and an optical system having the same.

2. Description of Related Art

One of the conventional methods of correcting the chromatic aberrations of the optical system is to combine a plurality of glasses (lenses) of different dispersions (Abbe numbers) from one another.

In addition to the above method of lessening the chromatic aberrations by using the combination of glass materials, there is another method of using a diffractive optical element having the diffracting function in the lens surface or the surface of other parts of the optical system, as disclosed in SPIE Vol. 1354 International Lens Design Conference (1990), Japanese Laid-Open Patent Applications No. Hei 4-213421 and No. Hei 6-324262, and U.S. Pat. No. 5,044,706, etc.

This method is based on the physical phenomenon that, for the rays of light in the wavelengths other than a reference wavelength, the refractive surface and the diffractive surface in the optical system produce chromatic aberrations in opposite directions to each other.

Further, in such a diffractive optical element, when the period of its diffraction grating is made to vary depending on the place, the diffractive optical element can take an effect similar to an aspherical lens, giving a great advantage of reducing the aberrations of the optical system.

Here, on comparison of the refracting action of light, for the lens surface, one ray of light, even after being refracted, remains the one. For the diffraction grating, on the other hand, it is typical that one ray of light, when diffracted, is divided into a plurality of rays of light of different diffraction orders.

To employ the diffractive optical element in the lens system, therefore, determination of the grating structure must be made such that, for a useful wavelength region, the light ray diffracts in concentration on a particular one order (design order). In a case where the energy of incident light concentrates on the diffracted light of the particular order, the intensities of the diffracted light rays of the other orders become low. If the sum of the intensities of the diffracted light rays of the other orders is zero, the diffracted light rays of the other orders are considered to be not present.

To this purpose, it becomes necessary that, for the design order, the light ray diffracts with a high enough efficiency (ideally, 100%). It should be also noted that, if the diffracted light of any of other orders than the design order is present, it forms an image at a different place from that of the design order, becoming flare.

In the optical system that utilizes the diffractive optical element, therefore, it is important to fully consider not only the spectral distribution of the diffraction efficiency for the design order, but also the behavior of the diffracted light of the other orders.

Suppose, as shown in FIG. 1, when a diffractive optical element 1 is formed with a diffraction grating 3 in one layer on a substrate 2 or a surface in the optical system, then the diffraction efficiencies for particular orders are obtained as shown in FIG. 2. In the graph of FIG. 2, the abscissa represents the wavelength, and the ordinate represents the diffraction efficiency. This diffractive optical element is so designed that, for the diffracted light of the first order (shown by a solid line curve), the diffraction efficiency becomes highest in the useful wavelength region.

That is, the design order is the first order. In addition, there are also shown the diffraction efficiencies for diffraction orders near the design order, i.e., or zero order and second order ((1±1)st orders).

As shown in FIG. 2, in the design order, the diffraction efficiency has a highest value at a certain wavelength (540 nm) (hereinafter, referred to as the "design wavelength"), and gradually lowers as the wavelength goes away from the design wavelength. This lowering of the diffraction efficiency in the design order is reflected to the diffracted light of the other orders, thereby producing flare. Also, in a case where a plurality of diffractive optical elements are in use, it particularly results that the diffraction efficiency lowers in the wavelengths other than the design wavelength. This leads to a decreases in the transmittance of the entire optical system.

An arrangement for reducing this lowering of the diffraction efficiency is proposed in U.S. patent application Ser. No. 09/121,685 (Japanese Patent Application No. Hei 9-217103). FIG. 3 is a sectional view of the main parts of the diffractive optical element 1 proposed in U.S. patent application Ser. No. 09/121,685. The diffractive optical element 1 shown in FIG. 3 has a laminated cross-section form with two layers 4 and 5 of diffraction gratings on a substrate 2 in superimposed relation to each other. Then, the refractive indices and dispersion characteristics of the materials of the two layers 4 and 5 and their grating thicknesses are optimized to obtain higher diffraction efficiencies throughout the entire range of useful wavelengths.

In the type of diffractive optical element shown in FIG. 3, as the material of the diffraction grating for each layer, use may be made of easy-to-cut optical glasses, plastics, or optically transparent, ultraviolet curable polymer. In this case, however, it becomes difficult to take as large a difference in the refractive index as in the mono-layer type. Therefore, the large difference in the optical path length becomes harder to take. For this reason, the diffraction grating becomes considerably thick. For example, in the diffractive optical element 1 of the two-layer structure, the material used for the first layer 4 is assumed to be an ultraviolet curable polymer of refractive index nd=1.525 and Abbe number vd=47.8, and the material used for the second layer 5 is assumed to be another ultraviolet curable polymer of refractive index nd=1.635 and Abbe number vd=23.0. In this combination, the grating thicknesses are optimized. Then, the resultant diffraction efficiency is shown in FIG. 4. It is understandable that the diffraction efficiency of the first order is kept high over the entire visible spectrum. In this case, however, the first diffraction grating 4 has a thickness d1 of 12.70 $\mu$m, and the second diffraction grating 5 has a thickness d2 of 9.55 $\mu$m. On consideration of the usual one-layer diffraction grating whose thickness is about 1 $\mu$m, the two-layer diffraction grating has so much a large thickness. Also, in actual practice of manufacturing, because the second layer 5 shown in FIG. 3 is sectioned by every grating pitch, the use of the production technique by molding or the like results in a difficulty of transferring the form and detaching from the die.

BRIEF SUMMARY OF THE INVENTION

An object of the present invention is to provide a diffractive optical element which is actually more practical to utilize than was heretofore possible. This utilizable diffractive optical element has such a fundamental structure that, as shown in FIG. 5, diffraction gratings 4 and 5 which differ in dispersion from each other are first formed in separation, then, both the diffraction gratings 4 and 5, while keeping their corresponding pitches to each other in alignment, are brought into a near juxtaposition, and through a certain space whose refractive index is "1" (for example, air), the diffraction gratings 4 and 5 are superimposed on each other.

Such diffraction gratings are manufactured by the ruling machine. So, the product can be used directly as the actual optical element. It may otherwise be used as a master grating, from which to produce replica gratings. In the former case, as the edge angle of the diffraction grating is more acute than that in the conventional or mono-layer type. If, as the diffractive optical element is made directly by ruling, the material is plastic or the like, there is a high possibility of chipping off the edges during ruling. In the latter case, when detaching the cast from the mold, the tip of the edge becomes dull or like phenomenon occurs, because the edge angle is so much acute.

Now, for the structure of the diffractive optical element as shown in FIG. 5, with the use of the brittle material described above, a form is considered that the first and second diffraction gratings 4 and 5 have their grating edges cut by 0.5 $\mu$m from the tip, as shown in FIG. 6. The diffraction efficiency obtained in this situation is shown in FIG. 7. In calculation, the grating pitch used is 70 $\mu$m. From the graph of FIG. 7, it is understood that the diffraction efficiency has lowered 3.5% or so over almost the entire visible spectrum. This lowering is reflected to the production of flare. In application to the diffractive optical element that has a pair of confronted diffraction gratings made of materials which differ in dispersion from each other, therefore, the diffraction efficiency for a particular diffraction order (design order) must be raised over the entire range of useful wavelengths. For this purpose, at least part of tips of a grating surface of one of the diffraction gratings and at least part of valleys, corresponding to the tips, of a grating surface of the other of the diffraction gratings are chamfered to a predetermined shape or formed to the predetermined shape (chamfered shape). Thus, the amount of flare can be reduced. In the following, including the claims, what is called the "chamfered" shape in the present specification includes the shape obtained by chamfering and the shape obtained by forming to the predetermined shape.

In accordance with an aspect of the invention, there is provided a diffractive optical element, which comprises a pair of diffraction gratings, the pair of diffraction gratings differing in dispersion from each other, the pair of diffraction gratings confronting each other through a space of a refractive index of 1, wherein a maximum optical path length difference occurring in the pair of diffraction gratings with respect to each of at least two wavelengths is integer times the associated wavelength.

In accordance with another aspect of the invention, there is provided a diffractive optical element, which comprises a pair of diffraction gratings, the pair of diffraction gratings differing in dispersion from each other, the pair of diffraction gratings confronting each other through a space of a refractive index of 1, wherein a maximum optical path length difference occurring in the pair of diffraction gratings with respect to each of at least two wavelengths is integer times the associated wavelength, and peak portions and valley portions of the pair of diffraction gratings are chamfered or formed in a chamfered shape.

In accordance with a further aspect of the invention, there is provided a diffractive optical element, which comprises a pair of diffraction gratings, the pair of diffraction gratings differing in dispersion from each other, wherein a maximum optical path length difference occurring in the pair of diffraction gratings with respect to each of at least two wavelengths is integer times the associated wavelength, and peak portions and valley portions of the pair of diffraction gratings are chamfered or formed in a chamfered shape.

In accordance with a further aspect of the invention, there is provided a diffractive optical element, which comprises a substrate, and a diffraction grating formed on the substrate, wherein either or both of peak portions and valley portions of the diffraction grating are chamfered or formed in a chamfered shape.

In the pair of diffraction gratings described above, there are embodiments, one of which is to divide the entire ruled surface into a plurality of zones, wherein the size and/or form of the chamfered portions is or are different with the different zones, and the other of which is not to differentiate this size or form.

A further embodiment is that the chamfered area has a form of a flat plane and, as the flat plane is projected onto the surface of the substrate on which the diffraction grating is formed, the length "a" of the flat plane in a direction of grating arrangement of a grating surface lies within the following range:

$$0.5 \ \mu m < a < 2 \ \mu m$$

Another embodiment is that the chamfered area has a form of a curved surface and, as the curved surface is projected onto a flat plane made by a direction (line) of grating arrangement of a grating surface and a normal line of the substrate on which the diffraction grating is formed, a radius of curvature "r" of the curved surface lies within the following range:

$$0.5 \ \mu m < r < 2 \ \mu m$$

An optical system according to the invention has a feature of using any one of the diffractive optical elements of the forms described above. As the optical system, mention may be made of an image forming optical system and an observation optical system.

In accordance with a further aspect of the invention, a diffractive optical element in which a plurality of diffraction gratings of respective different Abbe numbers are laminated is characterized in that the Abbe number of at least one of the plurality of diffraction gratings is not more than 30.

In accordance with a further aspect of the invention, a diffractive optical element in which a plurality of diffraction gratings of respective different Abbe numbers are laminated to such a grating structure as to heighten the diffraction efficiency of diffracted light of a particular order throughout an entire usable wavelength region is characterized in that the Abbe number of at least one of the plurality of diffraction gratings is not more than 30.

In accordance with a further aspect of the invention, a diffractive optical element in which a plurality of diffraction gratings of respective different Abbe numbers are laminated is characterized in that a grating thickness of each of the plurality of diffraction gratings is not more than 10 μm and that the Abbe number of at least one of the plurality of diffraction gratings is not more than 30.

In accordance with a further aspect of the invention, a diffractive optical element in which a plurality of diffraction gratings of respective different Abbe numbers are laminated to such a grating structure as to heighten the diffraction efficiency of diffracted light of a particular order throughout an entire usable wavelength region is characterized in that a grating thickness of each of the plurality of diffraction gratings is not more than 10 μm and that the Abbe number of at least one of the plurality of diffraction gratings is not more than 30.

In accordance with a further aspect of the invention, a diffractive optical element has any one of the forms of the elements described above and is characterized in that at least one of the plurality of diffraction gratings has an Abbe number of not less than 40 and is made from, for example, glass.

In accordance with a further aspect of the invention, a diffractive optical element has any one of the forms of the elements described and is characterized in that one of the plurality of diffraction gratings which has an Abbe number of not more than 30 is made from ultraviolet curable polymer.

In accordance with a further aspect of the invention, a diffractive optical element has any one of the forms of the elements described above and is characterized in that a grating thickness of each of the plurality of diffraction gratings is not more than 7.5 μm and that the Abbe number of at least one of the plurality of diffraction gratings is not more than 25.

In accordance with a further aspect of the invention, a diffractive optical element in which a plurality of diffraction gratings of respective different Abbe numbers are laminated to such a grating structure as to heighten the diffraction efficiency of diffracted light of a particular order throughout an entire usable wavelength region is characterized in that a high-molecular polymer is used for a material of at least one of the plurality of diffraction gratings and that a material having an Abbe number of not more than 25 is used for a material of at least another one of the plurality of diffraction gratings.

In accordance with a further aspect of the invention, a diffractive optical element in which a plurality of diffraction gratings of respective different Abbe numbers are laminated to such a grating structure as to heighten the diffraction efficiency of diffracted light of a particular order throughout an entire usable wavelength region is characterized in that a grating thickness of each of the plurality of diffraction gratings is not more than 10 μm, that a high-molecular polymer is used for a material of at least one of the plurality of diffraction gratings, and that a material having an Abbe number of not more than 25 is used for a material of at least another one of the plurality of diffraction gratings.

In accordance with a further aspect of the invention, a diffractive optical element in which a plurality of diffraction gratings of respective different Abbe numbers are laminated to such a grating structure as to heighten the diffraction efficiency of diffracted light of a particular order throughout an entire usable wavelength region is characterized in that a grating thickness of each of the plurality of diffraction gratings is not more than 10 μm, that a high-molecular polymer is used for a material of at least one of the plurality of diffraction gratings and that an ultraviolet curable polymer having an Abbe number of not more than 25 is used for a material of at least another one of the plurality of diffraction gratings.

In accordance with a further aspect of the invention, a diffractive optical element in which a plurality of diffraction gratings of respective different Abbe numbers are laminated to such a grating structure as to heighten the diffraction efficiency of diffracted light of a particular order throughout an entire usable wavelength region is characterized in that a grating thickness of each of the plurality of diffraction gratings is not more than 7.5 μm, that a high-molecular polymer is used for a material of at least one of the plurality of diffraction gratings, and that a material having an Abbe number of not more than 20 is used for a material of at least another one of the plurality of diffraction gratings.

In accordance with a further aspect of the invention, a diffractive optical element in which a plurality of diffraction gratings of respective different Abbe numbers are laminated to such a grating structure as to heighten the diffraction efficiency of diffracted light of a particular order throughout an entire usable wavelength region is characterized in that a grating thickness of each of the plurality of diffraction gratings is not more than 7.5 μm, that a high-molecular polymer is used for a material of at least one of the plurality of diffraction gratings and that an ultraviolet curable polymer having an Abbe number of not more than 20 is used for a material of at least another one of the plurality of diffraction gratings.

In accordance with a further aspect of the invention, a diffractive optical element has any one of the forms of the elements described above and is characterized in that the plurality of diffraction gratings include at least one diffraction grating which differs from the others in grating direction.

In accordance with a further aspect of the invention, a diffractive optical element has any one of the forms of the elements described above and is characterized in that the usable wavelength region is a visible spectrum.

In accordance with a further aspect of the invention, a diffractive optical element has any one of the forms of the elements described above and is characterized in that the plurality of diffraction gratings are formed on a transparent substrate and that, among the plurality of diffraction gratings, a diffraction grating nearest to the transparent substrate is made from the same material as that of the transparent substrate.

In accordance with a further aspect of the invention, a diffractive optical element has any one of the forms of the elements described above and is characterized in that each of the plurality of diffraction gratings satisfies a condition of "$d/P < 1/6$", where P is a grating pitch thereof and d is a grating thickness thereof.

In accordance with a further aspect of the invention, a diffractive optical element has any one of the forms of the elements described above and is characterized in that each of the plurality of diffraction gratings satisfies a condition of "$1 < d < 6$", where d is a grating thickness (μm) thereof.

In accordance with a further aspect of the invention, a diffractive optical element has any one of the forms of the elements described above and is characterized in that the diffractive optical element is designed such that the diffraction efficiency thereof becomes 97% or higher throughout the entire usable wavelength region.

In accordance with a further aspect of the invention, a diffractive optical element has any one of the forms of the elements described above and is characterized in that the diffractive optical element is designed such that, with respect to each of spectral d-line, F-line and C-line, the diffraction efficiency thereof becomes 99% or higher.

In the diffractive optical element according to any one aspect of the invention, in a case where there are three layers of diffraction gratings, the number of kinds of materials for the diffraction gratings is not confined to be equal to the number of layers. Thus, the number of kinds of materials for the diffraction gratings may be made smaller than the number of layers. For example, in the case of the 3-layer type, it is also possible to make an arrangement that the diffraction gratings in the first and third layers are of the same material, while a different material from the above material is used for the diffraction grating in the second layer.

In the diffractive optical element according to any one aspect of the invention, it is preferred that any adjacent two of the diffraction gratings are laminated through an air layer.

An optical system of the invention is characterized by having any one of the diffractive optical elements described above.

An image forming optical system of the invention is characterized by having any one of the diffractive optical elements described above.

A photographic optical system of the invention is characterized by having any one of the diffractive optical elements described above.

An observation optical system of the invention is characterized by having any one of the diffractive optical elements described above.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 8:
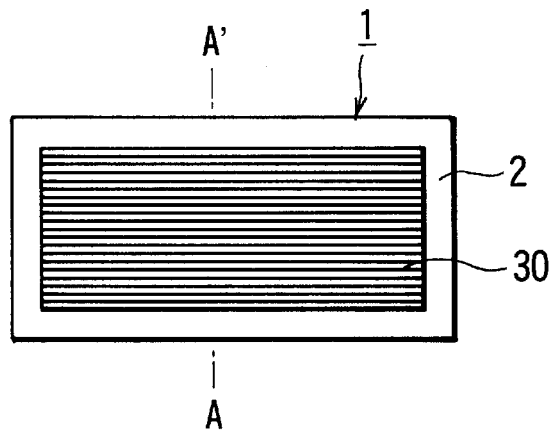
FIG. 8 is a front elevation view of the main parts of a diffractive optical element according to a first embodiment of the invention.
Figure 9:
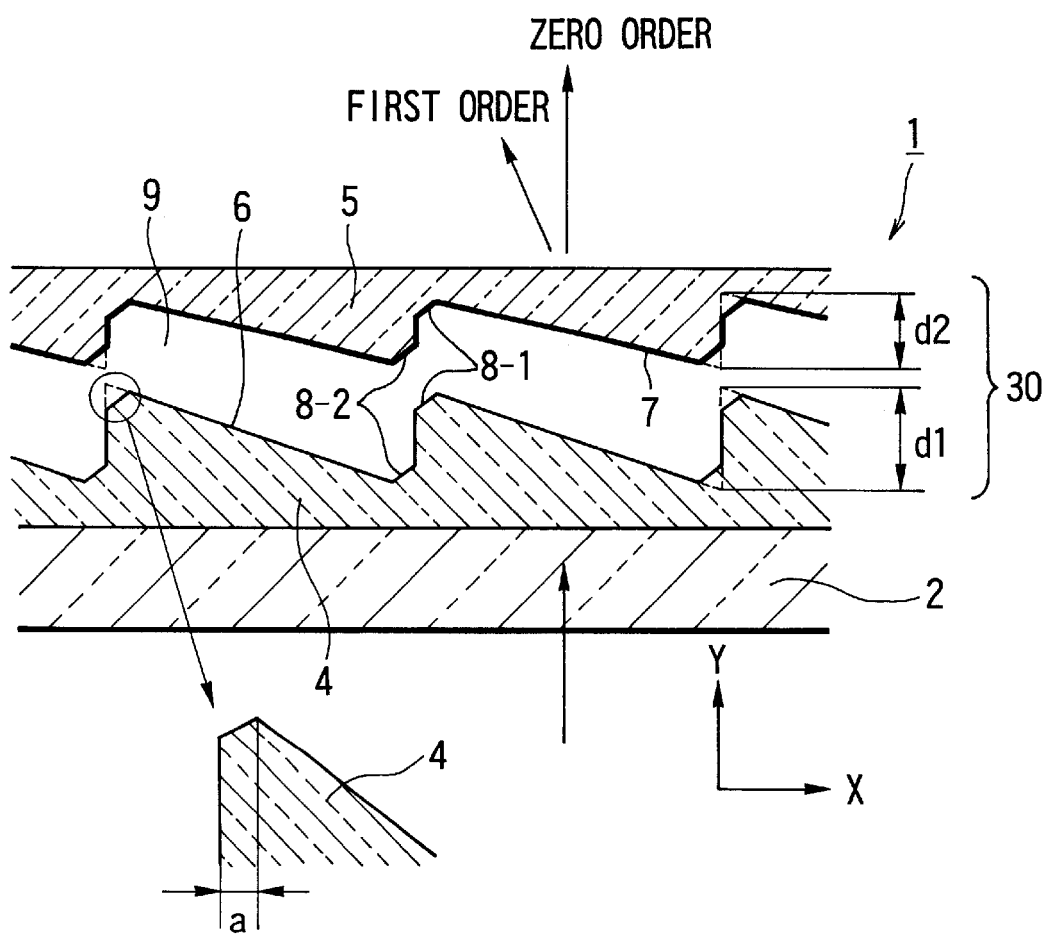
FIG. 9 is a sectional view of the main parts of the diffractive optical element according to the first embodiment of the invention.

FIG. 8 is a front elevation view of a diffractive optical element according to a first embodiment of the invention. Referring to FIG. 8, the diffractive optical element 1 has such a structure that a multi-layer portion 30 which is composed of a plurality of layers (diffraction gratings) in superimposed relation in the direction perpendicular to the drawing paper of FIG. 8 is formed on the surface of a substrate 2. FIG. 9 is a fragmental cross-section view of the diffractive optical element 1 shown in FIG. 8 taken along A-A' line of FIG. 8, with the diffraction gratings 4 and 5 illustrated as considerably deformed in the depth direction (in the vertical direction in the drawing paper).

For the diffractive optical element 1 according to the first embodiment, the profile of its diffraction grating comprises two layers, i.e., the first layer (first diffraction grating) 4 and the second layer (second diffraction grating) 5 formed on the substrate 2. At a boundary between the first layer 4 and an air layer 9, whose refractive index is 1, there is formed a first diffraction grating surface 6. At another boundary between the second layer 5 and the air layer 9, there is formed a second diffraction grating surface 7.

The diffractive optical element 1 shown in FIG. 9 is provided with chamfered portions 8-1 and 8-2 at the peak portions and valley portions of each of the diffraction gratings 4 and 5, in which edge portions thereof confront each other. Further, all the layers act as one diffractive optical element 1.

In such a manner, the diffractive optical element according to the first embodiment is constructed with a pair of diffraction gratings whose materials are different in dispersion from each other on the substrate in superimposed relation with their diffraction grating surfaces confronting each other through the air layer. With this arrangement, the chamfered portions 8-1 and 8-2 are formed at the peak portions and valley portions of the diffractive optical surface 6 of the one diffraction grating 4 and the corresponding valley portions and peak portions of the diffraction grating surface 7 of the other diffraction grating 5. For the diffractive optical element 1, the visible light is selected as the useful wavelengths, and the first order of diffraction is used as the particular diffraction order. To increase the diffraction efficiency for the first order over the entire range of visible spectrum, determination is made of the design wavelengths and the materials for the diffraction gratings 4 and 5. Also, the amount and shape of chamfering are determined so as to reduce flare to a desired amount.

Next, the diffraction efficiency of the diffractive optical element according to the first embodiment is described.

Figure 1:
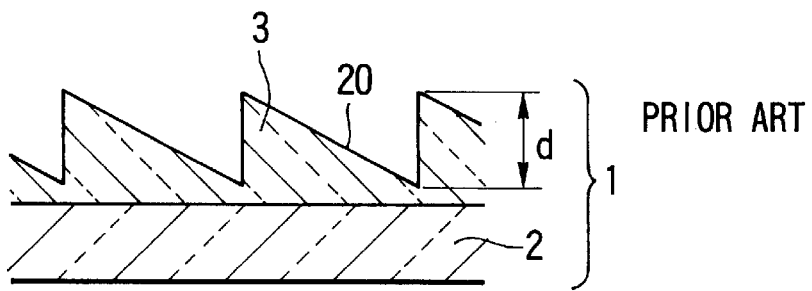
FIG. 1 is a sectional view (saw-tooth wave form) of a conventional example of diffraction grating.
Figure 2:
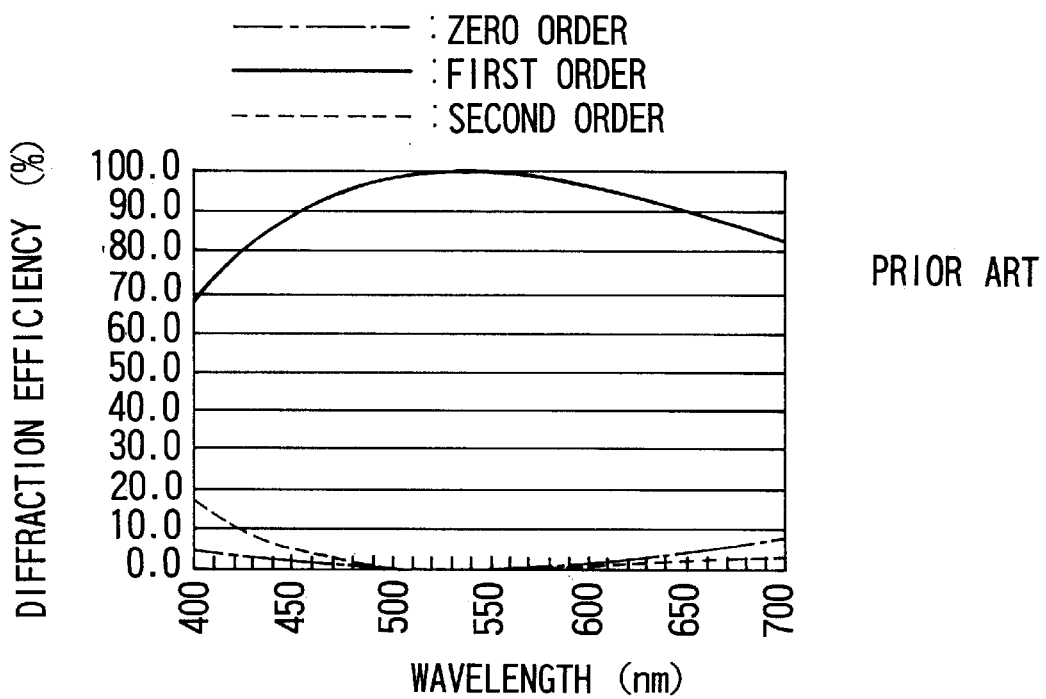
FIG. 2 is a graph of the diffraction efficiency of the conventional example shown in FIG. 1.

In the usual one-layer transmission-type diffraction grating 3 which is used in the air, as shown in FIG. 1, the diffraction efficiency at a design wavelength λ0 is highest under the condition that, as light rays enter the diffraction grating 3 at right angles, the optical path length difference d0 between the peak and valley of the diffraction grating surface 20 is integer times the design wavelength λ0. Since the refractive index of the air is 1, the following expression is obtained:

$$d0=(n0-1)d=m\lambda 0 \quad (1)$$

where n0 is the refractive index for the design wavelength λ0 of the material of the diffraction grating 3, d is the grating thickness, and m is the diffraction order.

Even for the diffractive optical element, according to the first embodiment of the invention, which has two or more layers of diffraction gratings, the basic concept is the same. To make all the layers function as one diffraction grating of high diffraction efficiency, for each of at least two wavelengths, the optical path length differences between the peaks and valleys of the diffraction grating surfaces formed at boundaries between the layers are obtained, and the sum obtained by adding together the optical path length differences over all the layers is determined to become integer times the associated wavelength.

Figure 5:
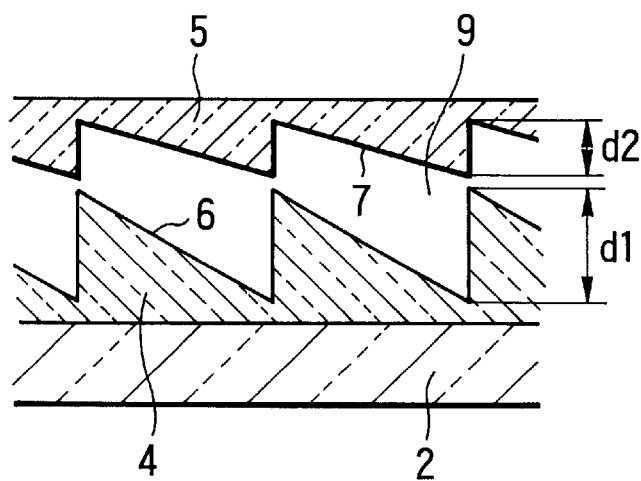
FIG. 5 is a sectional view showing the fundamental structure of a laminated-type diffractive optical element according to the invention.
Figure 6:
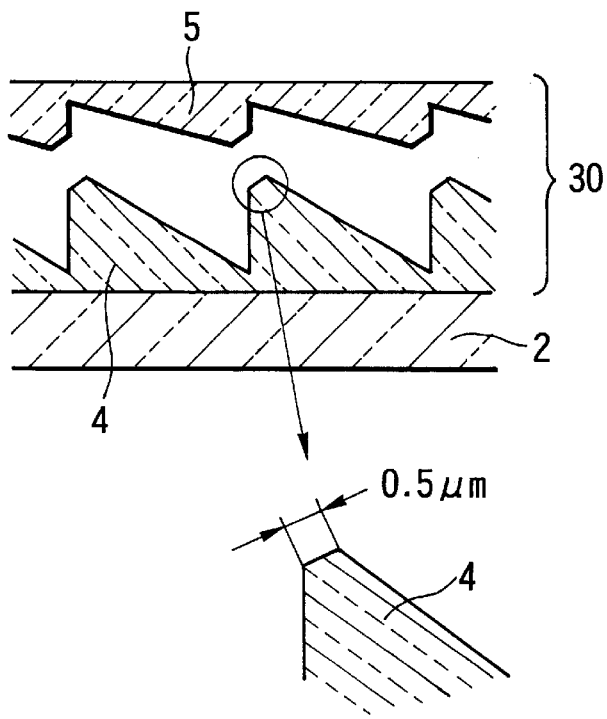
FIG. 6 is a diagram for explaining a case where a manufacturing error has occurred in manufacturing the laminated-type diffractive optical element shown in FIG. 5.

Therefore, since the refractive index of the air is 1, the condition in the case of the first embodiment shown in FIG. 5 or FIG. 9 becomes as expressed below:

$$(n01-1)d1-(n02-1)d2=m\lambda 0 \quad (2)$$

where n01 and n02 are the refractive indices for the wavelength λ0 of the materials of the first and second layers 4 and 5, respectively, and d1 and d2 are the grating thicknesses of the first and second diffraction gratings (the first and second layers) 4 and 5, respectively.

Here, the diffracting direction is taken into account. Assuming that, in FIG. 9, the diffracted light to the left side of that of zero order is of positive order, then any layer in the equation (2) must be given either of plus and minus signs. For a grating shape with the thickness decreasing in a direction from the left to the right as viewed in FIG. 9, or for the first layer 4, the sign to be used is positive. Conversely, when the thickness increases in the direction from the left to the right, or for another grating shape as in the second layer 5, the sign to be used is negative. It is also to be noted that the grating thickness is measured in such an ideal form that no chamfering is done at the portions 8-1 and 8-2, leaving the grating edge at an acute angle.

Figure 7:
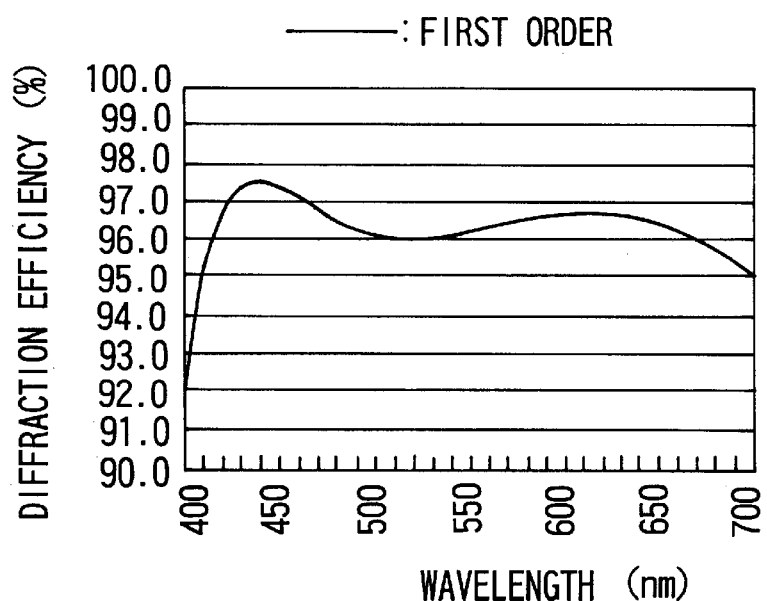
FIG. 7 is a graph of the diffraction efficiency of the laminated-type diffraction grating in which the manufacturing error has occurred.
Figure 10:
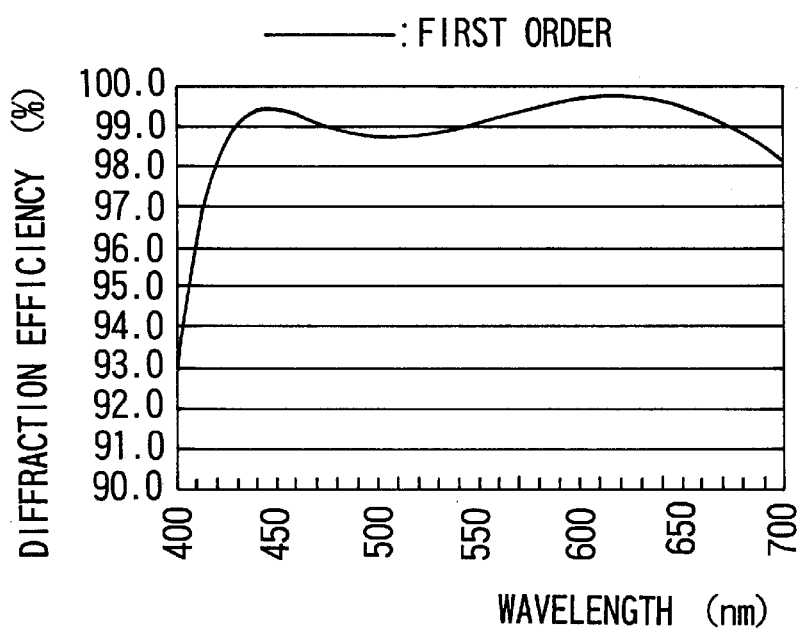
FIG. 10 is a graph of the diffraction efficiency of the diffractive optical element according to the first embodiment of the invention.

Next, the effect of the chamfered portions formed in the edge portions of the diffraction grating surface in the first embodiment is described below. As the laminated-type diffractive optical element in the first embodiment, an example is taken of the two-layer structure shown in FIG. 9. Here, the material used for the first layer 4 is an ultraviolet curable polymer of refractive index nd=1.525 and Abbe number vd=47.8. Another ultraviolet curable polymer which has a refractive index nd=1.635 and an Abbe number vd=23.0 is used for the second layer 5. The grating pitch is 70 μm. All the edges of the diffraction grating surfaces are chamfered to a flat plane by an amount of 0.5 μm. The diffraction efficiency obtained in this instance is shown in FIG. 10. As is understandable from FIG. 10, although the diffraction efficiency has deteriorated 1% from that of the ideal form at shorter wavelengths than 440 nm, the lowering is reduced to 0.3% throughout almost the entire range of visible spectrum. As compared with the case where some of the edges are accidentally dulled, or the graph of FIG. 7 where the lowering is 3.5%, therefore, the amount of flare, too, is suppressed to 1/10, thus improving the performance.

It should be pointed out that, in the first embodiment, if the chamfering is too much small, the breaking of the tip and the transferability cannot be improved. If too much large, an unduly large deterioration of the diffraction efficiency results. Therefore, it is preferred that the chamfered amount in terms of the projected length "a" of the chamfered flat area on the substrate 2 in a direction X of grating arrangement of the diffraction grating surface lies within the following range:

$$0.5 \,\mu m < a < 2 \,\mu m$$

Although the foregoing discussion has been made as limited to the shape of one period (grating element) of the diffraction grating, the same conclusion can be applied even to the entirety (all the periods) of the diffraction grating.

Figure 11:
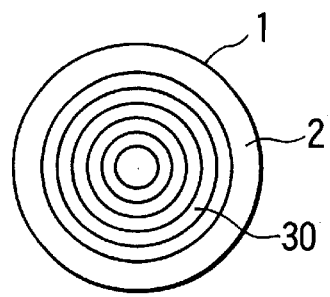
FIG. 11 shows an example of a modification of the diffractive optical element according to the first embodiment of the invention.

Also, since the period (pitch) of the diffraction grating does not affect the diffraction efficiency, the principle of the first embodiment is applicable not only to the one-dimensional isopitch type of diffraction granting shown in FIG. 8, but also to diffractive optical elements having diffraction gratings in a wide variety of forms such as a diffractive optical lens having a zonal type diffraction grating with the pitch progressively changing toward the margin like that shown in FIG. 11.

Figure 12:
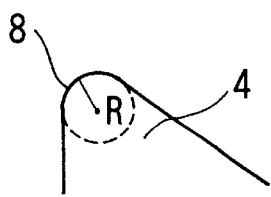
FIG. 12 is a fragmentary sectional view in enlarged scale of a modification of the diffractive optical element according to the first embodiment of the invention.

Also, in the first embodiment, the chamfered form has been in the flat plane. However, the chamfered form is not limited to the flat plane. For example, the chamfered form may otherwise be such a curved surface that, when projected to a plane (X-Y plane) defined by the X direction of grating arrangement of the grating surface and a Y direction in the normal to the substrate, it becomes a curved line as shown in FIG. 12. That is, a round form in the X-Y plane may be used with a minute radius of curvature R. In this case, too, it is preferred that the same as the above-described chamfered amount for the flat plane applies to the radius R of the curved surface, lying in the following range:

$$0.5 \mu m < R < 2 \mu m$$

Also, although the first embodiment has been descried in connection with the flat plate as the substrate 2 on which to put a plurality of diffraction gratings in superimposed relation when making the diffractive optical element, the plurality of diffraction gratings of laminated structure may otherwise be put on the surface of a lens or like curved surface. Even in this case, similar results are attained.

Also, although the first embodiment has been described in connection with the first order of diffraction, the invention is not confined to the first order, but applicable to the second order or a predetermined one of any other orders than the first order. Even for another order, the same improved results are attained provided that the overall optical path length difference with the diffracted light of a desired order becomes the same as a desired design wavelength.

Figure 13:
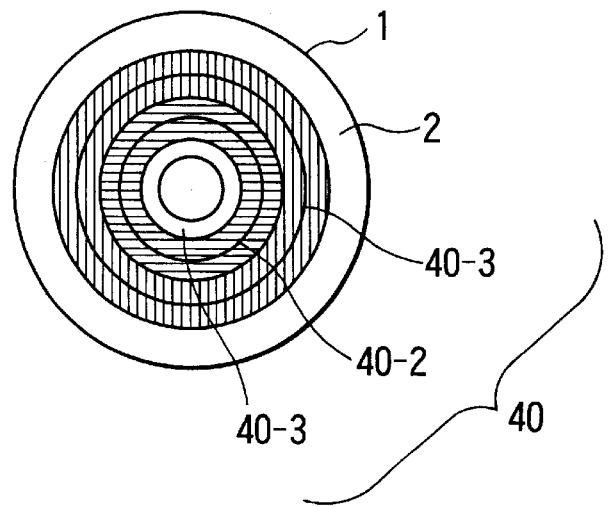
FIG. 13 is a front elevation view of the main parts of a diffractive optical element according to a second embodiment of the invention.

FIG. 13 is a front elevation view of the main parts of a diffractive optical element according to a second embodiment of the invention.

In the second embodiment, the diffractive optical element 40 is divided into a plurality of areas 40-1, 40-2 and 40-3. Of the plurality of areas 40-1, 40-2 and 40-3, at least one area is given the above-described chamfering. If a plurality of areas are given the above-described chamfering in the second embodiment, these areas are made different from each other in the chamfered form of the edges. Specifically, in a case where the diffractive optical element also serves as a lens like that shown in FIG. 13, the grating pitch becomes progressively smaller as going from the center to the margin. Along with this, the angle of the grating edge becomes progressively more acute toward the margin. Therefore, the marginal area 40-3 is chamfered to a rather large amount. The chamfered amount of the intermediate area 40-2 is made smaller than that of the marginal area 40-3. The paraxial area 40-1 is, because the edges have a dull angle, either lessened in the chamfered amount from that of the area 40-2, or not chamfered at all as the case may be. In such a manner, the chamfered amount and/or the chamfered form is made to vary with variation of the edge angle. Accordingly, the lowering of the diffraction efficiency can be suppressed as far as possible, and the manufacturing of the diffractive optical element is also made easier.

Figure 14:
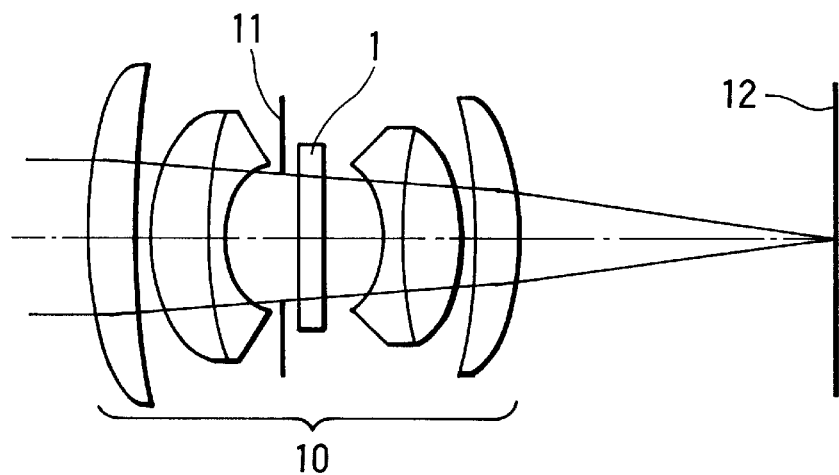
FIG. 14 is a longitudinal section view of an example of application of the diffractive optical element to a photographic optical system, according to a third embodiment of the invention.

FIG. 14 is a schematic diagram of an optical system using the diffractive optical element according to a third embodiment of the invention. This optical system is used for photography with a camera or the like. In FIG. 14, a photographic lens 10 contains a lens assembly, a diaphragm 11 and the diffractive optical element 1 in the interior thereof.

At a focal plane 12, there is film or a CCD.

By using the diffractive optical element of the invention, the wavelength-dependent property of the diffraction efficiency is remarkably improved. Therefore, the flare is reduced and the resolving power in the low frequencies is increased, so that a photographic lens of high performance is thus achieved. Since the diffractive optical element of the invention is amenable to the low-cost production techniques, it is also made possible to provide an objective which is excellent in productivity and inexpensive in a sense of the photographic lens.

In FIG. 14, the diffractive optical element 1 of the invention is provided on a flat parallel glass plate adjacent to the diaphragm 11. However, the invention is not confined thereto. The diffractive optical element 1 may otherwise be provided on the curved surface of any lens element, or may be plural in number to use.

Also, the third embodiment has been illustrated in view of its application to a photographic lens of a camera. However, the invention is not confined thereto and is applicable to the taking lenses for video cameras, or the reader lenses for image scanners or digital copiers in office machines. Even in such variations, similar improved results are attained.

Figure 15:
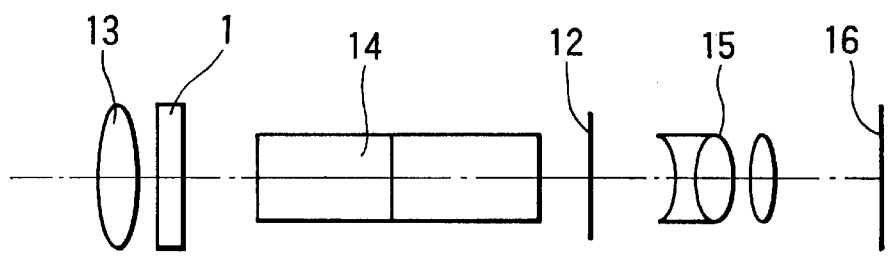
FIG. 15 is a longitudinal section view of another example of application of the diffractive optical element to an observation optical system.

FIG. 15 is a schematic diagram of another type of an optical system using the diffractive optical element of the invention. This type is assumed to be an observation optical system such as a binocular. In FIG. 15, an objective lens 13, an image inverting prism 14 for erecting the image, and an eyepiece lens 15 constitute either side of the binocular. Reference numeral 16 denotes an evaluation plane (pupil plane).

In FIG. 15, the diffractive optical element is denoted by reference numeral 1. The diffractive optical element 1 is formed with an aim to correct chromatic aberrations at an image plane 12 of the objective lens 13.

By using the diffractive optical element of the invention, the wavelength-dependent property of the diffraction efficiency is remarkably improved. Therefore, the flare is reduced and the resolving power in the low frequencies is increased, so that an objective lens of high performance is thus achieved. Since the diffractive optical element of the invention is amenable to the low-cost production techniques, it is also made possible to provide an objective which is excellent in productivity and inexpensive in a sense of the observation optical system.

The present embodiment has been illustrated with the diffractive optical element 1 positioned just behind the objective lens 13, but the invention is not confined thereto. It may take its place on the surface of the prism or in the interior of the eyepiece lens 15. Even in these variations, similar results are attained. It is to be noted in this connection that the diffractive optical element on the object side of the image plane 12 has an effect of reducing chromatic aberrations in the objective 13 alone. In the case of the observation optical system for the naked eye, it is, therefore, desired that the diffractive optical element takes its place at least on that side which includes the objective lens 13.

Also, although the present embodiment has been described with the use of the diffractive optical element of the invention in the binocular, the usage of this diffractive optical element is not confined thereto, but may be applied to terrestrial or astronomical telescopes and also applied to optical viewfinders for leaf-shutter-type cameras or video cameras. Even in these variations, similar results are attained.

According to the foregoing embodiments, a diffractive optical element which is amenable to economic production techniques while still keeping a high diffraction efficiency and which is capable of suppressing the flare, and an optical system having the diffractive optical element can be achieved.

Since the grating edges of each diffraction grating can be made dull in angle by chamfering them, the shape tolerance is greatly improved in ruling the diffraction grating. When forming the diffraction grating by the molding technique, the accuracy and reliability with which the shape of the edge of the master diffraction grating is transferred to the cast are also greatly improved. As a result, a diffractive optical element which is stable in shape and, therefore, good in performance is obtained. For this reason, even when the diffractive optical element is incorporated in the optical system, the diffraction efficiency can be kept high. It is therefore, made to provide an optical system which can suppress the amount of flare light to a minimum.

Further, by changing the chamfered amount of the edges of the diffraction gratings by every area of the diffractive optical element, the lowering of the diffraction efficiency can be suppressed to a maximum. When used in the optical system, the diffractive optical element can keep the high diffraction efficiency, which in turn suppresses flare.

Figure 3:
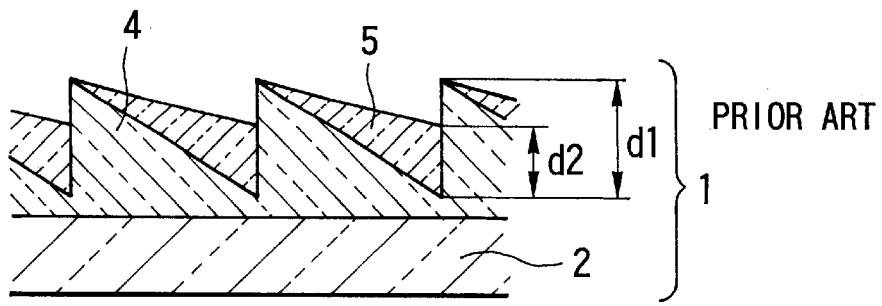
FIG. 3 is a sectional view of a conventional laminated-type diffractive optical element.
Figure 4:
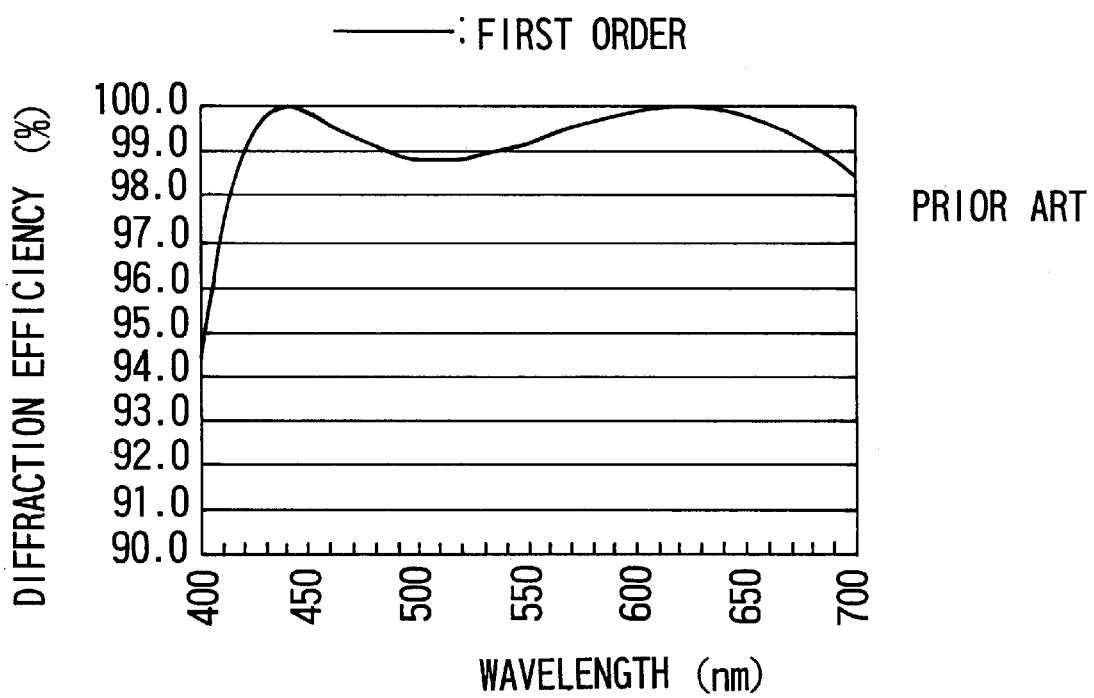
FIG. 4 is a graph of the diffraction efficiency of the conventional laminated-type diffractive optical element.

Moreover, the technique of chamfering the peak portions and valley portions of the diffraction grating is applicable to such diffractive optical elements as shown in FIGS. 1 and 3.

Figure 16:
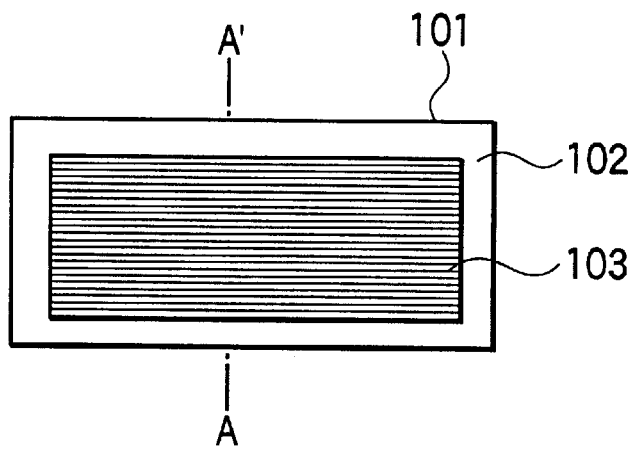
FIG. 16 is a plan view showing a one-dimensional diffractive optical element according to a fourth embodiment of the invention.

FIG. 16 is a front elevation view of a diffractive optical element according to a fourth embodiment of the invention.

In FIG. 16, the diffractive optical element 101 has such a structure that a diffraction grating 103 is formed on the surface of a substrate 102.

Figure 17:
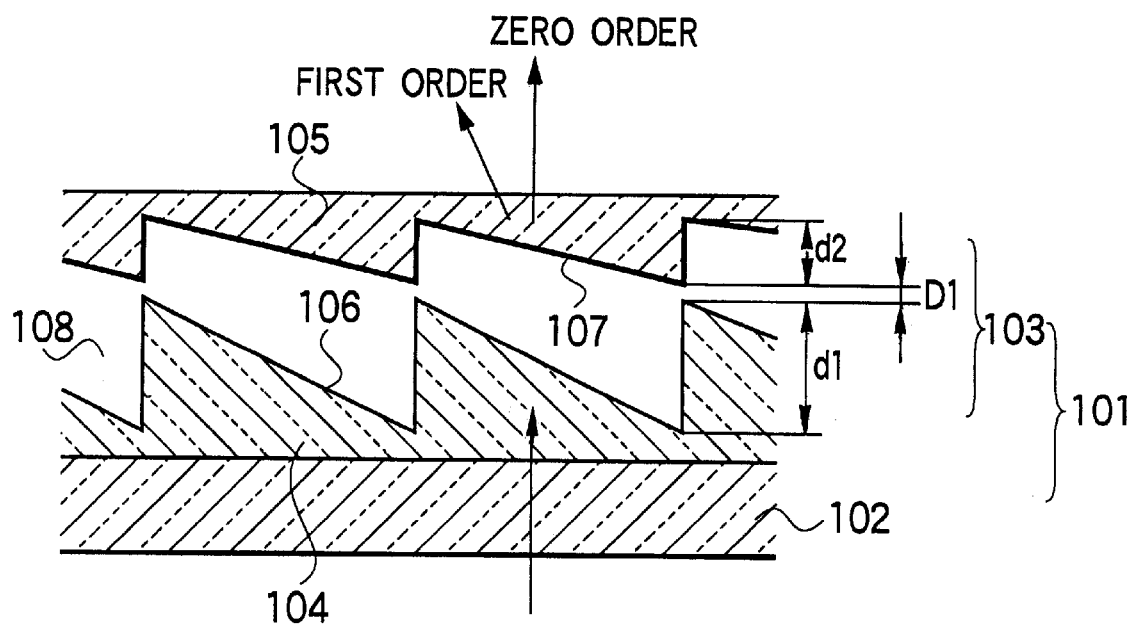
FIG. 17 is a sectional view showing the shapes of the diffraction gratings of the diffractive optical element according to the fourth embodiment.

FIG. 17 is a fragmental cross-section view of the diffractive optical element 101 taken along A-A' line in FIG. 16, with the elements depicted as considerably deformed in the depth direction. As is apparent from FIG. 17, the diffractive optical element 101 is composed of the substrate 102, a first-layer diffraction grating (a first diffraction grating) 104 and a second-layer diffraction grating (a second diffraction grating) 105, which are laminated on the substrate 102 in this order, with an air layer 108 disposed therebetween. The first diffraction grating 104 has a first diffraction grating surface 106 at the boundary between the first diffraction grating 104 and the air layer 108. The second diffraction grating 105 has a second diffraction grating surface 107 at the boundary between the air layer 108 and the second diffraction grating 105. Further, the sizes of the first and second diffraction gratings 104 and 105, as measured in terms of the pitch P ($\mu$m) and the grating thickness d ($\mu$m), lie within a range of "d/P<⅙". If this condition is satisfied, it is easy to control the grating shape either when manufacturing the elements themselves, or when making master gratings by machining.

The diffractive optical element operates in a region of wavelengths. In the case described above, the visible spectrum is chosen as such usable wavelength region. So, the diffraction efficiency of diffracted light of the first order has to be increased throughout the entire visible spectrum. For this purpose, determination is made of what materials are to be used for the first and second diffraction gratings and how deep the grooves of the diffraction gratings should be. As some materials and a number of values of the depth are found, appropriate ones are selected under the conditions that the first and second diffraction gratings 104 and 105 each are not more than 10 $\mu$m thick and that one of the first and second diffraction gratings 104 and 105 has an Abbe number of not more than 30, while the other of the first and second diffraction gratings 104 and 105 has an Abbe number of not less than 40.

The reason why such rules of design are set forth is described below.

In the ordinary or mono-layer diffraction grating, the prerequisite for a highest diffraction efficiency in a certain order at a design wavelength $\lambda_0$ is that, as light enters the diffraction grating at right angles, the optical path length difference (in more detail, the difference between the lengths of the optical paths with light rays passing through the peak and valley of the diffraction grating) should be equal to integer times the wavelength of the light. Thus, the following equation can be expressed:

$$(n_{01}-1)d=m\lambda_0 \qquad (3)$$

where $n_{01}$ is the refractive index for the design wavelength $\lambda_0$ of the diffraction grating, d is the grating thickness, and m is the order number for diffracted light.

Since the above equation (3) contains the term of wavelengths, as far as one and the same order is concerned, the sign of equality does not stand at any wavelengths except only the design wavelength. Accordingly, at the wavelengths other than the design wavelength, the diffraction efficiency is caused to lower from the maximum. For a given value of wavelength $\lambda$, the diffraction efficiency can be expressed by the following equation:

$$\eta(\lambda)=sinc^2[\Pi\{M-(n(\lambda)-1)d/\lambda\}] \qquad (4)$$

where M is the order number for diffracted light to be evaluated, and $n(\lambda)$ is the refractive index of (the material of) the diffraction grating at the wavelength $\lambda$.

Even in the multi-layer diffractive optical element, having two or more layers of diffraction gratings, the diffraction efficiency can be treated fundamentally in the same way. To make all the layers of diffraction gratings to function as a single diffraction grating, the optical path length difference between the peak and valley of the diffraction grating formed at the boundary between every adjacent two of the layers (including also the air layer) constituting the diffractive optical element is determined so that the total sum of the values of the optical path length differences over all the diffraction gratings becomes equal to integer times the wavelength.

In the diffractive optical element shown in FIG. 17, therefore, the condition for a highest diffraction efficiency in an order m at the design wavelength $\lambda_0$ is given by the following expression:

$$\pm(n_{01}-1)d1\pm(n_{02}-1)d2=m\lambda_0 \qquad (5)$$

where $n_{01}$ and $n_{02}$ are the refractive indices for the design wavelength $\lambda_0$ of the materials of the first and second diffraction gratings 104 and 105, respectively, and d1 and d2 are the grating thicknesses of the first and second diffraction gratings 104 and 105, respectively.

Here, on assumption that, in a case where diffraction occurs to the left side of the central ray that has diffracted in the zero order in FIG. 17, the orders of diffraction are taken as positive, while, in a case where diffraction occurs to the right side of the central ray that has diffracted in the zero order in FIG. 17, the orders of diffraction are taken as negative, the sign of plus-minus ($\pm$) in the equation (5) gives a positive sign (+) for the diffraction grating 104 with the grooves of such a shape that the grating thickness decreases in a direction from left to right as shown in FIG. 17. Conversely when the grating thickness increases in a direction from left to right, a negative sign (−) is given as in the case of the diffraction grating 105.

In the arrangement shown in FIG. 17, the diffraction efficiency for a wavelength $\lambda$ other than the design wavelength $\lambda_0$ can be expressed by the following equation:

$$\eta(\lambda)=sinc^2[\Pi\{M-\{\pm(n_1(\lambda)-1)d1\pm(n_2(\lambda)-1)d2\}/\lambda\}]$$

where M is the order number for diffracted light to be evaluated, $n_1(\lambda)$ and $n_2(\lambda)$ are the refractive indices for the wavelength $\lambda$ of the materials of the first and second diffraction gratings 104 and 105, respectively, and d1 and d2 are the grating thicknesses of the first and second diffraction gratings 104 and 105, respectively.

Putting $\Phi(\lambda) = \pm(n_1(\lambda)-1)d1 \pm (n_2(\lambda)-1)d2$, the following equation is obtained:

$$\eta(\lambda) = sinc^2[\Pi\{M - \Phi(\lambda)/\lambda\}] \tag{6}$$

While the diffractive optical element has been illustrated in FIG. 17 with its diffraction grating surfaces 106 and 107 formed at the boundaries between the air layer 108 and the optical material layers 104 and 105, it is to be understood that the invention is not confined thereto. The diffraction grating surfaces each may otherwise be positioned at the boundary between two layers of different materials except air or like gas.

Next, an explanation is made about rules of design in the fourth embodiment in which, despite the thinner diffraction grating, a higher diffraction efficiency can be obtained. As an example of the thinner diffraction grating, in the arrangement shown in FIG. 17, the first diffraction grating 104 is made to have a thickness d1 of 10 μm. In this premise, the features required for the material to be used in the second diffraction grating 105 are determined.

For a particular order, that is, the design order, a diffraction efficiency of 99% or higher is assumed to be obtained in the visible spectrum at three wavelengths of d-line, C-line and F-line.

First, in order for the diffraction efficiency to be equal to or higher than 99%, the value of $\eta(\lambda)$ in the equation (6) is required to be 0.99 or higher. The required value of $\Phi((\lambda)$ for 99% or higher of the diffraction efficiency at each of the wavelengths of d-line, C-line and F-line is then found out. Supposing the design order and the use order are the same and the first order, then M=1, and it is understood that the following conditions are required to be satisfied:

$$0.94476*0.58756 \leq \Phi(d) \leq 1.05524*0.58756$$

$$0.94476*0.65627 \leq \Phi(C) \leq 1.05524*0.65627$$

$$0.94476*0.48613 \leq \Phi(F) \leq 1.05524*0.48613,$$

that is, $$0.55510 \leq \Phi(d) \leq 0.62002 \tag{7}$$

$$0.62002 \leq \Phi(C) \leq 0.69252 \tag{8}$$

$$0.45928 \leq \Phi(F) \leq 0.51298 \tag{9}$$

Further, the following relationships can be derived.

$$\Phi(d) = (n_1(d)-1)d1 - (n_2(d)-1)d2 \tag{10}$$

$$\Phi(C) = (n_1(C)-1)d1 - (n_2(C)-1)d2 \tag{11}$$

$$\Phi(F) = (n_1(F)-1)d1 - (n_2(F)-1)d2 \tag{12}$$

where $n_1(d)$, $n_1(C)$ and $n_1(F)$ are the refractive indices for the spectral d-line, C-line and F-line of (the materials of) the first diffraction grating 104, respectively, and $n_2(d)$, $n_2(C)$ and $n_2(F)$ are the refractive indices for the spectral d-line, C-line and F-line of (the material of) the second diffraction grating 105, respectively.

Here, the required value of Abbe number for the material of the second diffraction grating 105 is considered. From the definition of the Abbe number, the value v2 of Abbe number of the second diffraction grating 105 is given by the following expression:

$$v2 = \{n_2(d)-1\}/\{n_2(F) - n_2(C)\} \tag{13}$$

The equation (13) can be deformed as follows:

$$v2 = \{n_2(d) - 1\}/[\{n_2(F)-1\} - \{n_2(C)-1\}]$$

$$= \{n_2(d) - 1\}d2/[\{n_2(F) - 1\}d2 - \{n_2(C) - 1\}d2]$$

Putting into the above equation the equations (10), (11) and (12), the following equation is obtained:

$$v2 = \frac{\{n_1(d)-1\}d1 - \Phi(d)}{\{n_1(F)-1\}d1 - \Phi(F) - \{n_1(C)-1\}d1 + \Phi(C)} \tag{14}$$

As indicated by the equation (14), once the material and grating thickness of the first diffraction grating 104 have been determined, the required value of Abbe number of the material for the second diffraction grating 105 can be determined irrelevant to the refractive index and grating thickness of the material of the second diffraction grating 105.

Figure 18:
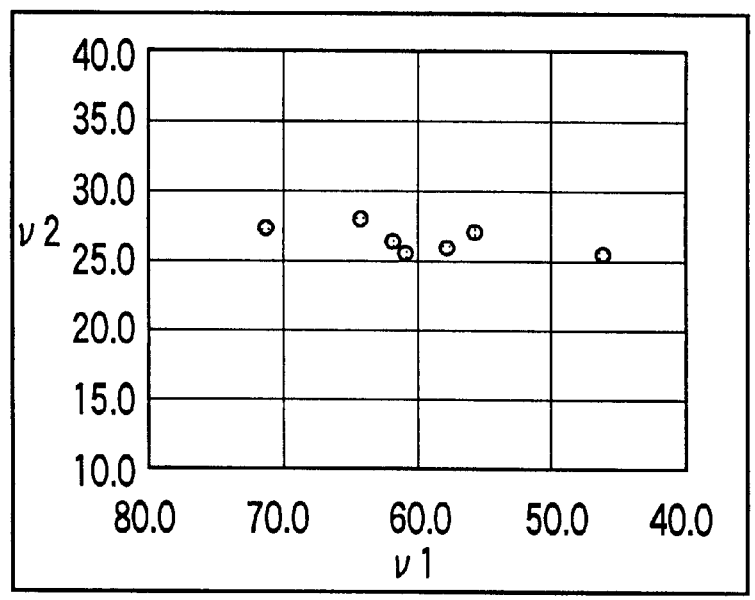
FIG. 18 is a graph showing the material characteristics of the diffractive optical element according to the fourth embodiment.

FIG. 18 shows the relationship between the values of Abbe number of the first and second diffraction gratings 104 and 105. In FIG. 18, with the grating thickness of the first diffraction grating 104 taken at 10 μm and with the choice of various optical glasses taken as the material of the first diffraction grating 104, the required values of Abbe number of the material of the second diffraction grating 105 are plotted. Although the Abbe number of the material of the second diffraction grating 105 can be determined by the equation (14), the value of $\Phi(\lambda)$ in the equation (14) becomes any value in the ranges of the inequalities (7), (8) and (9). Accordingly, the Abbe number selectable for the second diffraction grating 105 becomes a value within a range. FIG. 18 is graphed out by using the largest of the values of Abbe number in the range in plotting. As is understandable from FIG. 18, whilst the Abbe number for the first diffraction grating 104 has some width of from 46 to 72 or thereabout, the Abbe number for the second diffraction grating 105 varies in as narrow a range as from 25 to 28 or thereabout.

Figure 19:
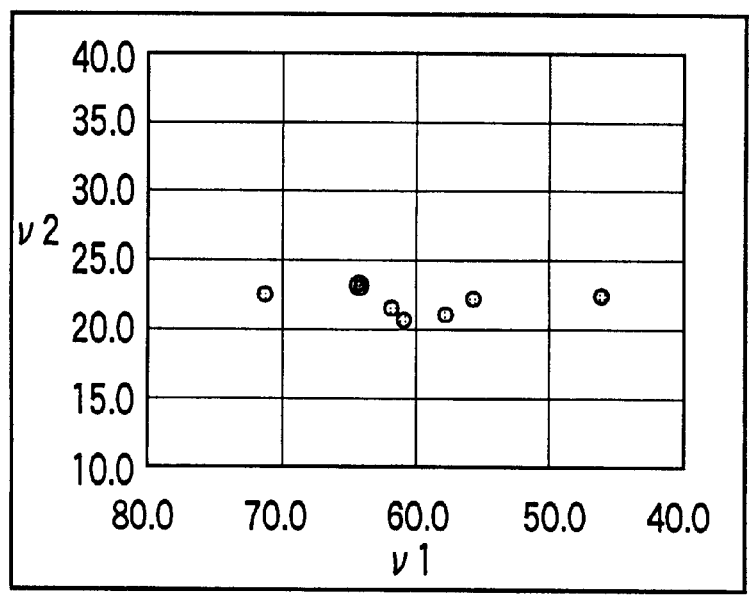
FIG. 19 is a graph showing the material characteristics of the diffractive optical element according to the fourth embodiment, when the grating thickness is changed from that in FIG. 18.

FIG. 19 is concerned with another situation when the first diffraction grating 104 shown in FIG. 17 is decreased in thickness to 7.5 μm, showing the relationships between the Abbe numbers of the first and second diffraction gratings 104 and 105. FIG. 19, too, is graphed out in a similar way to that of FIG. 18. In the case of FIG. 19, the required values of Abbe number of the second diffraction grating 105 becomes smaller than those of FIG. 18 by about 5. Therefore, from these facts, it is found that, in the laminated-type diffractive optical element, when the grating thickness is decreased to below 10 μm, while still obtaining a higher diffraction efficiency than was heretofore possible, it becomes necessary for the second diffraction grating 105 to use a material whose Abbe number v2 is not more than 30.

As the material for the second diffraction grating 105 that satisfies the above-described conditions, mention may be made of optical glasses, plastics and ultraviolet curable polymers. On consideration of the productivity (amenability to mass production), formability and so on, plastic resin, ultraviolet curable polymer and the like are preferable.

Figure 20:
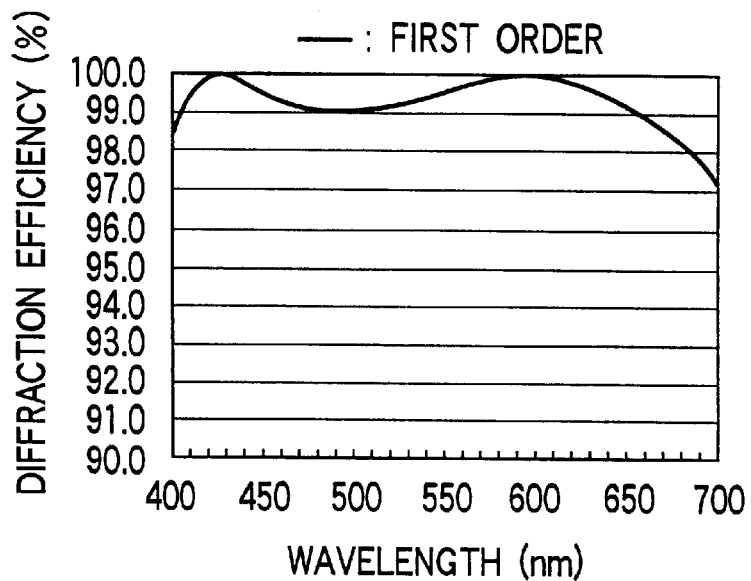
FIG. 20 is a graph showing the diffraction efficiency in the first order of the diffractive optical element according to the fourth embodiment.
Figure 21:
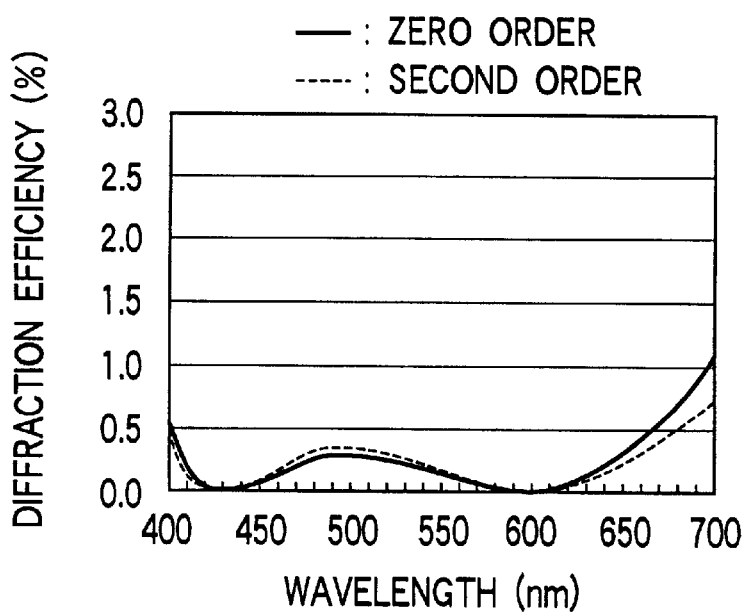
FIG. 21 is a graph showing the diffraction efficiency in the zero order and the second order of the diffractive optical element according to the fourth embodiment.

In FIGS. 20 and 21, there is shown the diffraction efficiency of the laminated-type diffractive optical element shown in FIG. 17 composed of a combination of materials indicated by a double circle, by way of example, among the combinations plotted in FIG. 19. This laminated-type diffractive optical element has its first diffraction grating 104 made from a material produced by Sumita Optical Glass Co., Ltd., under the trade name of LaFK60 (nd=1.63246, vd=63.8), and its second diffraction grating made from an ultraviolet curable polymer (nd=1.635, vd=23.0). The grating thickness of the diffraction grating 104 is made to be 7.5 μm and the grating thickness of the second diffraction grating 105 to be 6.54 μm.

FIG. 20 shows the diffraction efficiency of diffracted light in the design order, i.e., the first order, and FIG. 21 shows the diffraction efficiencies of diffracted light in the orders adjacent to the design order, i.e., the zero order and the second order.

As is understandable from FIGS. 20 and 21, the diffraction efficiencies for d-line, F-line and C-line are satisfactory as they are not less than 99%. Also, throughout the whole visible spectrum, the diffraction efficiency is maintained at as high as 97%. Further, the diffraction efficiencies in the zero order and the second order, too, are below 0.4% for d-line, F-line and C-line, and, with regard to the whole visible spectrum, not more than 1%, thus being considerably low. Therefore, it will be appreciated that the above laminated-type diffractive optical element has a very good performance.

Figure 22:
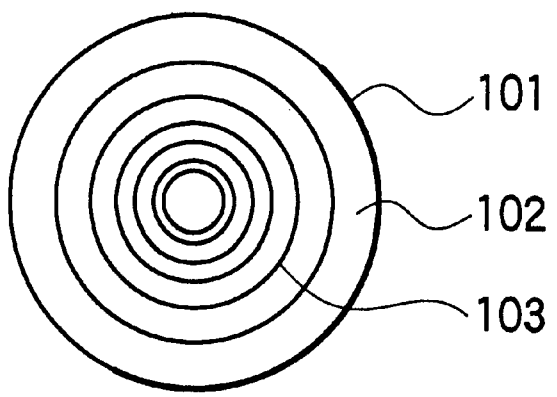
FIG. 22 is a plan view of a lens type of diffractive optical element according to the fourth embodiment.

Although the diffractive optical element shown in FIGS. 16 and 17 has been assumed to comprise diffraction gratings of constant grating pitches, it is to be understood that, since the diffraction efficiency does not fundamentally depend on the grating pitch, the invention is applicable with the above-described techniques even to another type of diffractive optical element which is provided with a lens function by progressively varying the grating pitch from the center to the margin as shown in FIG. 22.

Also, in a case where, for the first diffraction grating, the material to be used is an optical glass, it is rather better to select the same one as that of the substrate 102 and form both in unison, giving an advantage of reducing the number of parts and the production cost.

Although the fourth embodiment has been described in connection with the flat plane on which to apply the diffraction gratings when the laminated-type diffractive optical element is formed, the diffraction gratings may otherwise be put on a spherical surface such as the convex or concave surface of a lens. Even in this case, similar effects to those of the fourth embodiment can be obtained.

Also, although the fourth embodiment has been described with the design order number taken at 1, or the so-called "first-order" diffractive optical element, the design order number is not limited to 1, but the second, third or other order may be employed instead. Even in this case, if the combined optical path length difference of all the diffraction gratings is adjusted to a desired value of the design wavelength in a desired value of the design order number, similar effects to those of the fourth embodiment can be obtained. Further, the number of layers of diffraction gratings is not limited to 2, but may be 3 or more. Even in this case, if the combined optical path length difference of all the diffraction gratings is adjusted to a desired value of the design wavelength in a desired value of the design order number, similar effects to those of the fourth embodiment can be obtained.

Although the fourth embodiment has been described on the assumption that optical glass is used for the material of the first diffraction grating 104 and explained with respect to what characteristics are necessary to take into account in selecting the material for use in the second diffraction grating 105, it is to be understood that the material of the first diffraction grating 104 is not limited to optical glass, but plastic resin and ultraviolet curable polymer are also usable. By using these kinds of resin, it becomes easier to make diffraction gratings by molding, thus largely improving the productivity of diffractive optical elements. In the following, practical examples of making use of various kinds of resin as the material of the first diffraction grating 104 will be described as a fifth embodiment of the invention with reference to FIGS. 23 and 24.

Figure 23:
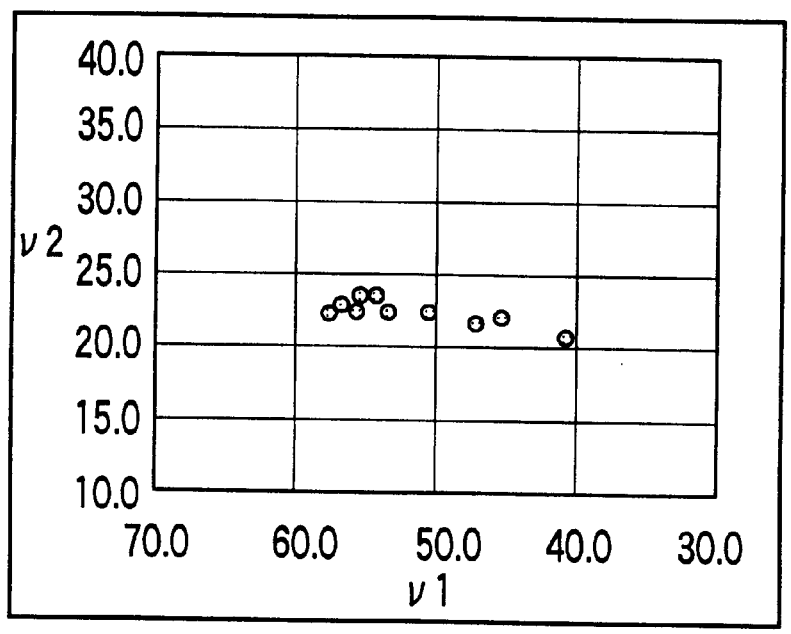
FIG. 23 is a graph showing the material characteristics of a diffractive optical element according to a fifth embodiment of the invention.

FIG. 23 is graphed out, with the grating thickness of the first diffraction grating 104 taken at 10 μm and with the choice of various polymers taken as its material, by plotting the combinations of values of Abbe number of the material of the first diffraction grating 104 and the corresponding values of Abbe number of the material of the second diffraction grating 105.

Figure 24:
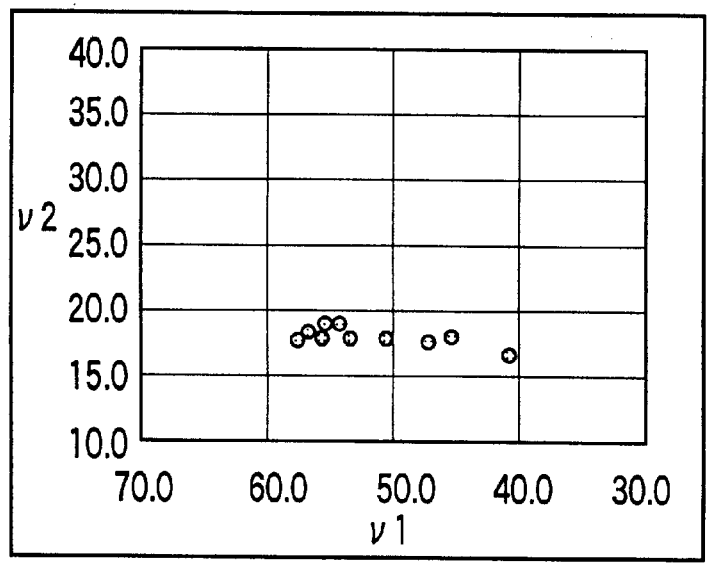
FIG. 24 is a graph showing the material characteristics of the diffractive optical element according to the fifth embodiment.

FIG. 24 is graphed out, with the grating thickness of the first diffraction grating 104 taken at 7.5 μm and with the choice of various polymers taken as its material, by plotting the combinations of values of Abbe number of the material of the first diffraction grating 104 and the corresponding values of Abbe number of the material of the second diffraction grating 105.

It will be seen that, in the laminated-type diffractive optical elements made from the combinations of the materials shown in FIG. 23 or 24, the required values of Abbe number for the second diffraction grating 105 become smaller than those shown in FIG. 18 or 19. However, similarly to what FIGS. 18 and 19 reveal, whilst the Abbe number of the material of the first diffraction grating 104 widely varies from 40 to 57 or thereabout, the Abbe number of the material for the second diffraction grating 105 in the case of FIG. 23 falls in a narrow range of from 20 to 24, and, also, the Abbe number of the material for the second diffraction grating 105 in the case of FIG. 24 falls in a narrow range of from 16 to 20.

Therefore, in the fifth embodiment, with the grating thickness of the first diffraction grating 104 made as thin as not more than 10 μm, use can be made of resin as its material. Even in this case, if the material for the second diffraction grating 105 has an Abbe number of not more than 25, it becomes possible to obtain a high diffraction efficiency.

In the present invention, letting the grating thicknesses of the first and second diffraction gratings 104 and 105 each be denoted by d (μm), a condition of "1<d<6" is set forth. When this condition is satisfied, it becomes possible to manufacture the diffractive optical element with more ease.

Figure 25:
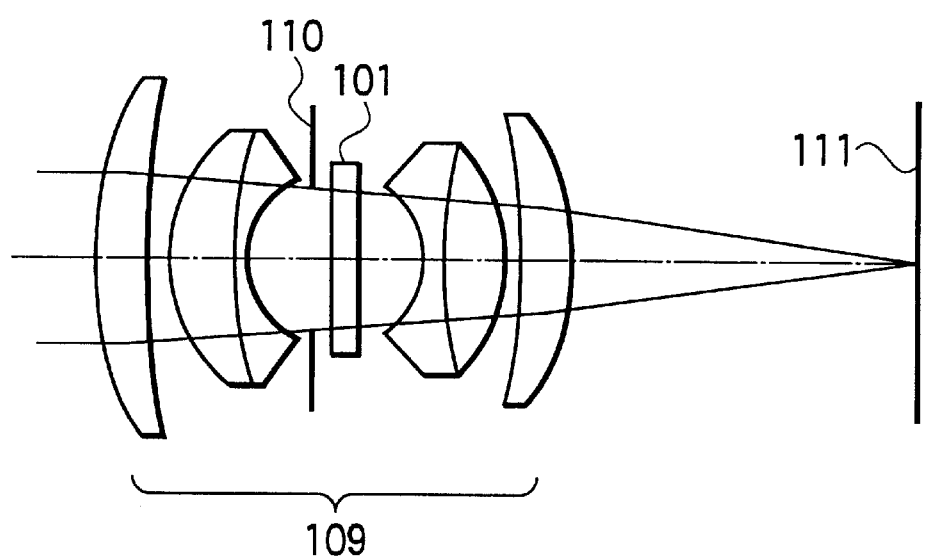
FIG. 25 is a longitudinal section view of a photographic optical system in which a diffractive optical element is incorporated according to a sixth embodiment of the invention.

A sixth embodiment of the invention is shown in FIG. 25, as applied to the photographic optical system for a camera or the like. Referring to FIG. 25, which illustrates a sectional view of the photographic optical system, a photographic lens 109 contains a diaphragm 110 and the above-described diffractive optical element 101 of the invention in the interior thereof. At a focal plane 111, there is film or a CCD. The diffractive optical element 101 is of the type having the lens function described in connection with FIG. 22, being used for correcting the chromatic aberrations of the photographic lens 109.

Owing to the use of the diffractive optical element 101 of the invention as an optical element that is greatly improved over the prior art in the wavelength dependency of the diffraction efficiency, the photographic lens 109 shown in FIG. 25 is lessened in flare light, and has a high resolving power even at low frequencies, thus obtaining a high performance. The diffractive optical element 101 is amenable even to such a simple production technique that, like the optical element having the air layer shown in FIG. 17, the diffraction gratings in each pair have first individually been manufactured and then cemented together at their adjoining marginal surfaces. It is, therefore, possible to provide a photographic lens which, as viewed from the standard, is excellent in mass production and is very inexpensive.

Although, in FIG. 25, the diffractive optical element 101 of the invention has been illustrated as set up on a flat glass plate adjacent to the diaphragm 110, the invention is not confined thereto. As mentioned before, the diffractive optical element 101 may be formed on the concave or convex surface of a lens. Further, a plurality of diffractive optical elements of the invention may be used in the photographic lens.

Also, although, in the sixth embodiment, application to the photographic lens for a camera has been exemplified, the invention is not confined thereto. Even if the diffractive optical element of the invention is used in the taking lenses for video cameras, the reader lenses for office instruments such as an image scanner and a digital copying machine, and like image forming optical systems which operate over a wide range of wavelengths, similar effects are attained.

Figure 26:
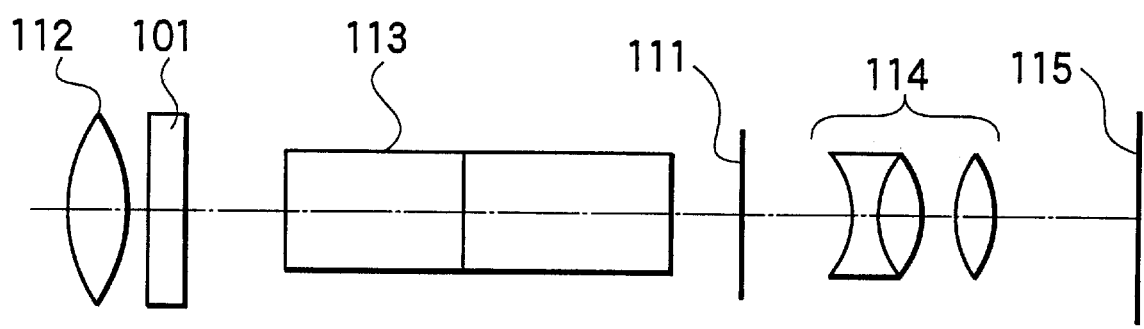
FIG. 26 is a longitudinal section view of an observation optical system in which a diffractive optical element is incorporated according to a seventh embodiment of the invention.

A seventh embodiment of the invention is shown in FIG. 26, as applied to the observation optical system such as a binocular. In FIG. 26, which is a sectional view of the observation optical system, an objective lens 112, a prism 113 for erecting the image and an eyepiece lens 114 are arranged on a common optical axis. Reference numeral 115 denotes an evaluation plane (pupil plane). The above-described diffractive optical element of the invention is denoted by reference numeral 101, being provided for the purpose of correcting chromatic aberrations at an image plane 111 of the objective lens 112.

Owing to the use of the diffractive optical element 101 of the invention as an optical element that is greatly improved over the prior art in the wavelength dependency of the diffraction efficiency, the observation optical system shown in FIG. 26 is lessened in flare light, and has a high resolving power even at low frequencies, thus obtaining a high performance. The diffractive optical element 101 is amenable even to such a simple production technique that, like the optical element having the air layer shown in FIG. 17, the diffraction gratings in each pair have first individually been manufactured and then cemented together at their adjoining marginal surfaces. It is, therefore, possible to provide an optical system which, as viewed in part (the objective lens) of the observation optical system, is excellent in mass production and is very inexpensive.

Although, in FIG. 26, the diffractive optical element 101 of the invention has been illustrated as set up on a flat glass plate, the invention is not confined thereto. As mentioned before, the diffractive optical element 101 may be formed on the concave or convex surface of a lens. Further, a plurality of diffractive optical elements of the invention may be used in the observation optical system.

Also, although, in the observation optical system shown in FIG. 26, the diffractive optical element 101 has been illustrated as positioned just behind the objective lens 112, the invention is not confined thereto. The diffractive optical element 101 may otherwise be positioned on the surface of the prism 113, or in the interior of the eyepiece 114. Even in this case, similar effects are attained. However, the diffractive optical element 101, when put on the object side of the image plane 111, has an effect of reducing the chromatic aberrations the objective lens 112 only produces. Therefore, in the case of the naked eye's observation optical system, it is desirable to put the diffractive optical element 101 at least on the side near to the objective lens 112.

Also, although, in the seventh embodiment, application to the binocular has been exemplified, the invention is not confined thereto. If the diffractive optical element of the invention is applied to terrestrial telescopes, astronomical telescopes and other types of observation optical systems, similar effects are attained. In application to optical viewfinders for lens-shutter cameras and video cameras, similar effects are also attained.

It should be also noted that, for each of the diffractive optical elements according to the embodiments shown in FIGS. 16 to 26, all the diffraction gratings in the laminated form may be modified in such a way that the grooves are chamfered at both of the peak and valley.

What is claimed is:

1. A diffractive optical element comprising a plurality of laminated diffraction gratings of materials having respective different Abbe numbers, wherein the Abbe number corresponding to at least one of the plurality of diffraction gratings is not more than 30, and the thickness of each of the plurality of diffraction gratings is not more than 10 μm.

2. A diffractive optical element in which a plurality of diffraction gratings of materials having respective different Abbe numbers are laminated to such a grating structure as to heighten the diffraction efficiency of diffracted light of a particular order throughout a wavelength region, wherein the Abbe number corresponding to at least one of the plurality of diffraction gratings is not more than 30, and the thickness of each of the plurality of diffraction gratings is not more than 10 μm.

3. A diffractive optical element in which a plurality of diffraction gratings of materials having respective different Abbe numbers are laminated to such a grating structure as to heighten the diffraction efficiency of diffracted light of a particular order throughout an entire usable wavelength region, wherein a grating thickness of each of the plurality of diffraction gratings is not more than 10 μm, the Abbe number corresponding to at least one of the plurality of diffraction gratings is not more than 30.

4. A diffractive optical element according to one of claims 1, 2 and 3, wherein the Abbe number corresponding to at least another one of the plurality of diffraction gratings is not less than 40.

5. A diffractive optical element according to one of claims 1, 2 and 3, wherein said at least one of the plurality of diffraction gratings having materials having the Abbe number of not more than 30 is made from ultraviolet curable polymer.

6. A diffractive optical element according to one of claims 1, 2 and 3, wherein a grating thickness of each of the plurality of diffraction gratings is not more than 7.5 μm and the Abbe number corresponding to said at least one of the plurality of diffraction gratings is not more than 25.

7. A diffractive optical element in which a plurality of diffraction gratings of materials having respective different Abbe numbers are laminated to such a grating structure as to heighten the diffraction efficiency of diffracted light of a particular order throughout a wavelength region, wherein a high-molecular polymer is used for a material of at least one of the plurality of diffraction gratings, wherein a material having an Abbe number of not more than 25 is used for a material of at least another one of the plurality of diffraction gratings, and the thickness of each of the plurality of diffraction gratings is not more than 10 μm.

8. A diffractive optical element according to claim 7, wherein the material having the Abbe number of not more than 25 is an ultraviolet curable polymer.

9. A diffractive optical element according to claim 7, wherein a grating thickness of each of the plurality of diffraction gratings is not more than 7.5 μm, and wherein the Abbe number corresponding to said at least another one of the plurality of diffraction gratings is not more than 20.

10. A diffractive optical element according to one of claims 2, 3 and 7, wherein the wavelength region is a visible spectrum.

11. A diffractive optical element according to one of claims 1, 2, 3 and 7, wherein the plurality of diffraction gratings include at least one diffraction grating which differs from the others in grating direction.

12. A diffractive optical element according to one of claims 1, 2, 3 and 7, wherein each of the plurality of diffraction gratings satisfies the following condition:

$$d/P < 1/6$$

where P is a grating pitch of each of the plurality of diffraction gratings, and d is a grating thickness of each of the plurality of diffraction gratings.

13. A diffractive optical element according to one of claims 1, 2, 3 and 7, wherein each of the plurality of diffraction gratings satisfies the following condition:

$$1 < d < 6$$

where d is a grating thickness ($\mu$m) of each of the plurality of diffraction gratings.

14. A diffractive optical element according to one of claims 1, 2, 3 and 7, wherein the plurality of diffraction gratings are formed on a transparent substrate, and wherein, among the plurality of diffraction gratings, a diffraction grating nearest to said transparent substrate is made from the same material as that of said transparent substrate.

15. A diffractive optical element according to one of claims 1, 2, 3 and 7, wherein said diffractive optical element is designed such that the diffraction efficiency thereof becomes 97% or higher throughout a particular wavelength region.

16. A diffractive optical element according to one of claims 1, 2, 3 and 7, wherein said diffractive optical element is designed such that the diffraction efficiency thereof becomes 99% or higher with respect to each of spectral d-line, F-line and C-line.

17. A diffractive optical element according to one of claims 1, 2, 3 and 7, wherein the plurality of diffraction gratings are laminated to form an air layer between at least two of the diffraction gratings.

18. An optical system comprising a diffractive optical element according to one of claims 1, 2, 3 and 7.

19. An image forming optical system comprising a diffractive optical element according to one of claims 1, 2, 3 and 7.

20. A photographic optical system comprising a diffractive optical element according to one of claims 1, 2, 3 and 7.

21. An observation optical system comprising a diffractive optical element according to one of claims 1, 2, 3 and 7.

* * * * *

UNITED STATES PATENT AND TRADEMARK OFFICE
CERTIFICATE OF CORRECTION

PATENT NO. : 6,560,019 B2
DATED : May 6, 2003
INVENTOR(S) : Takehiko Nakai

It is certified that error appears in the above-identified patent and that said Letters Patent is hereby corrected as shown below:

Column 2,
Line 28, "decreases" should read -- decrease --; and
Line 67, "so much" should be deleted.

Column 10,
Line 41, "much" should be deleted; and
Line 42, "much" should be deleted.

Column 11,
Line 10, "descried" should read -- described --.

Column 12,
Line 45, "objective" should read -- objective lens --.

Column 21,
Line 8, "include" should read -- includes --.

Signed and Sealed this

Ninth Day of December, 2003

JAMES E. ROGAN
*Director of the United States Patent and Trademark Office*